(12) United States Patent
Ahn et al.

(10) Patent No.: US 9,827,870 B2
(45) Date of Patent: Nov. 28, 2017

(54) CHARGE CONTROL METHOD AND SYSTEM FOR VEHICLE

(71) Applicants: Hyundai Motor Company, Seoul (KR); Kia Motors Corporation, Seoul (KR)

(72) Inventors: O Young Ahn, Gyeonggi-do (KR); Hyun Soo Park, Gyeonggi-do (KR); Ki Seung Baek, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 94 days.

(21) Appl. No.: 14/930,909

(22) Filed: Nov. 3, 2015

(65) Prior Publication Data

US 2017/0001537 A1    Jan. 5, 2017

(30) Foreign Application Priority Data

Jul. 3, 2015  (KR) .................. 10-2015-0095083

(51) Int. Cl.
*B60L 11/18* (2006.01)
*B60L 3/00* (2006.01)
*B60L 3/12* (2006.01)

(52) U.S. Cl.
CPC ......... *B60L 11/1868* (2013.01); *B60L 3/0046* (2013.01); *B60L 3/12* (2013.01); *B60L 11/1805* (2013.01); *B60L 11/1862* (2013.01); B60L 2200/18 (2013.01); B60L 2200/32 (2013.01); B60L 2200/36 (2013.01); B60L 2210/10 (2013.01); B60L 2240/12 (2013.01); B60L 2240/547 (2013.01); B60L 2240/80 (2013.01); B60L 2250/12 (2013.01); Y02T 10/7005 (2013.01)

(58) Field of Classification Search
CPC ............ Y02T 10/7066; B60L 11/1868; B60L 11/1816; H02J 7/0054; B60W 2540/06; B60W 2540/04
See application file for complete search history.

(56) References Cited

U.S. PATENT DOCUMENTS

| | | | |
|---|---|---|---|
| 2009/0024267 A1* | 1/2009 | Kawai | ................. B60K 6/445 701/22 |
| 2011/0187184 A1* | 8/2011 | Ichikawa | ............... B60L 1/003 307/10.1 |

(Continued)

FOREIGN PATENT DOCUMENTS

| | | |
|---|---|---|
| JP | 2012-085403 A | 4/2012 |
| KR | 10-2006-0067555 A | 6/2006 |

(Continued)

*Primary Examiner* — Dale Moyer
(74) *Attorney, Agent, or Firm* — Mintz Levin Cohn Ferris Glovsky and Popeo, P.C.; Peter F. Corless

(57) ABSTRACT

A charge control method for a vehicle is provided which includes charging a first battery when the vehicle is in an IG ON operational state, maintaining the IG ON operational state and monitoring a second battery voltage. The charge control method further includes charging a second battery, calculating a vehicle speed when the vehicle is in an EV READY state and adjusting the EV READY state of the vehicle to the IG ON operational state when the calculated vehicle speed is less than a predetermined speed.

12 Claims, 3 Drawing Sheets

(56) References Cited

U.S. PATENT DOCUMENTS

2013/0076123 A1\* 3/2013 Suzuki ................ B60L 11/1816
307/9.1
2014/0167680 A1\* 6/2014 Park ...................... H02J 7/0054
320/104

FOREIGN PATENT DOCUMENTS

| KR | 10-2006-0069136 A | 6/2006 |
|---|---|---|
| KR | 10-2008-0100493 A | 11/2008 |
| KR | 2012-0109883 A | 10/2012 |
| KR | 10-2013-0011073 A | 1/2013 |
| KR | 2014-0078859 A | 6/2014 |

\* cited by examiner

CHARGE CONTROL METHOD AND SYSTEM FOR VEHICLE

CROSS REFERENCE TO RELATED APPLICATION

The present application claims priority of Korean Patent Application Number 10-2015-0095083 filed on Jul. 3, 2015, the entire contents of which is incorporated herein for all purposes by this reference.

BACKGROUND

Field of the Invention

The present invention relates to a charge control method and system for a vehicle, and more particularly, for vehicles capable of charging a battery fully during an operational condition of an eco-friendly vehicle in IG ON and EV READY.

Description of the Related Art

Generally, eco-friendly vehicles require that a high voltage battery maintain the IG OFF operational state (e.g., ignition off) to charge the high voltage battery. Often, the battery is prevented from charging when a fault mode (e.g., failure conditions) occurs. For example, a fault mode may occur by attempting to engage a charging connector to charge the high voltage battery when the eco-friendly vehicle is in the IG ON operational state (e.g., ignition) and EV READY mode. In particular, engaging the vehicle start-up condition may be impossible when attempting to charge vehicle by connecting a high voltage charging connector when the eco-friendly vehicle is in the IG ON operational state. More specifically, when charging the high voltage battery when the eco-friendly vehicle is in the IG ON operational state, the vehicle's IG ON operational state is continuously maintained after the charging is completed. Accordingly, the voltage of an auxiliary battery is decreased due to an electric field load within a vehicle. Therefore, the voltage drop of the auxiliary battery precludes the vehicle from engaging the start-up sequence.

Furthermore, when the eco-friendly vehicle is in the EV READY mode and the battery is allowed to charge, a dangerous situation may occur. For example, the eco-friendly vehicle may move while remaining connected to the high voltage battery charging connector. Fundamentally, the eco-friendly vehicle is not allowed to charge the high voltage battery when eco-friendly vehicle is disposed in the EV READY mode. After the charging of the high voltage battery is completed, the vehicle may be maintained in the IG ON state. Furthermore, when the eco-friendly vehicle is in an EV READY mode, it may be impossible to engage the start-up operational sequence of the vehicle due to the above-described reasons. Therefore, due to the above reasons, the inconvenience of the vehicle maintaining the IG OFF operational mode to charge the high voltage battery is not required.

Various, control methods for discharge protection of an auxiliary battery have been suggested in the related art. For example, the method for charging an auxiliary battery has been developed that considers State of Charge (e.g., SOC) of a high voltage battery was suggested. However, such a method is merely a charging method for discharge protection of an auxiliary battery of a vehicle and cannot be used as protection logic applied to charge the high voltage battery when the vehicle is in the IG ON operational state or, the EV READY mode. Therefore, the inconvenience encountered by requiring the vehicle to maintain the IG OFF operational state to charge the high voltage battery, has not resolved.

The above information disclosed in this section is intended merely to aid in the understanding of the background of the invention, and therefore may contain information that does not form the prior art that is already known to a person of ordinary skill in the art.

SUMMARY

The present invention provides a charge control method for a vehicle capable of more stably charging a battery of a vehicle regardless of a vehicle state. In one aspect, the present exemplary embodiment provides a charge control method for a vehicle which may include verifying whether a first battery charging connector is connected to the vehicle and charging a first battery when the vehicle is engaged in an IG ON operational state when the first battery charging connector is connected; maintaining the IG ON operational state after charging the first battery in the IG ON operational state; a monitoring a second battery voltage while maintaining the IG ON operational state; charging a second battery engaging the first battery based on the result of monitoring the second battery voltage.

In some exemplary embodiments, the vehicle state may be changed to the IG ON operational state after verifying the first battery may be charged after the vehicle is in an IG OFF operational state when the first battery charging connector is connected. Additionally the vehicle state may be changed from the IG ON operational state to the IG OFF operational state after completion of the charge of the first battery. In other exemplary embodiments, a vehicle speed may be calculated when the vehicle is in EV READY mode when the first battery charging connector is connected. Further, the EV READY to mode may be changed to the IG ON operational state when the calculated vehicle speed is less than a predetermined speed.

In some aspects, the second battery charging process may include initiating the second battery charge when the monitored second is less than a predetermined voltage; and finishing the second battery charge after charging the second battery.

The second battery charge initiation may include verifying a SOC value of the first battery engaging a first battery relay ON when the SOC value of the first battery exceeds a predetermined SOC value; and of engaging the second battery charge from the first battery based on to the first battery relay ON state.

The second battery charge initiation may include verifying the second battery charge number and engaging the first battery relay ON when the second battery charge number is less than a predetermined number. Further, the second battery charge may be engaged from the first battery based on the first battery relay ON. In some exemplary embodiments, the second battery charge completion may include a monitoring the second battery voltage; and changing the first battery relay to an OFF position when the second battery voltage exceeds a predetermined voltage.

In other exemplary embodiments, the vehicle speed calculation, may precede an EV READY maintaining process when the vehicle controller the EV READY state of the vehicle. Accordingly, the vehicle speed may be calculated by the vehicle controller and when predetermined speed is exceeded, the maintaining process may be executed. When the vehicle battery is charged as described above, it may be possible to obtain the following effects. It may be possible to charge a battery with the vehicle disposed in the IG OFF operational state as well as the IG ON operational state and the EV READY mode. Furthermore, adjustments to the vehicle state to the IG OFF operational state in order to charge the battery of a vehicle may be avoided.

Secondly, the vehicle may maintain the IG ON operational state after completion of the battery charge, since the protection logic against the battery voltage reduction may be applied, it may possible to prevent the battery voltage reduce thereby precluding the vehicle start-up limitations.

Thirdly, it may be possible to prevent the vehicle from moving while connected to a battery charging connector, since a determination step of determining whether the battery should be charged based on a vehicle speed may be applied with the vehicle in the EV READY state.

Fourthly, verifying the SOC of the first battery and the charge number of the second battery may be applied prior to the first battery charging the second battery, thereby achieving the effects of the first battery protection and the life improvement of the second battery.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Figure 1:
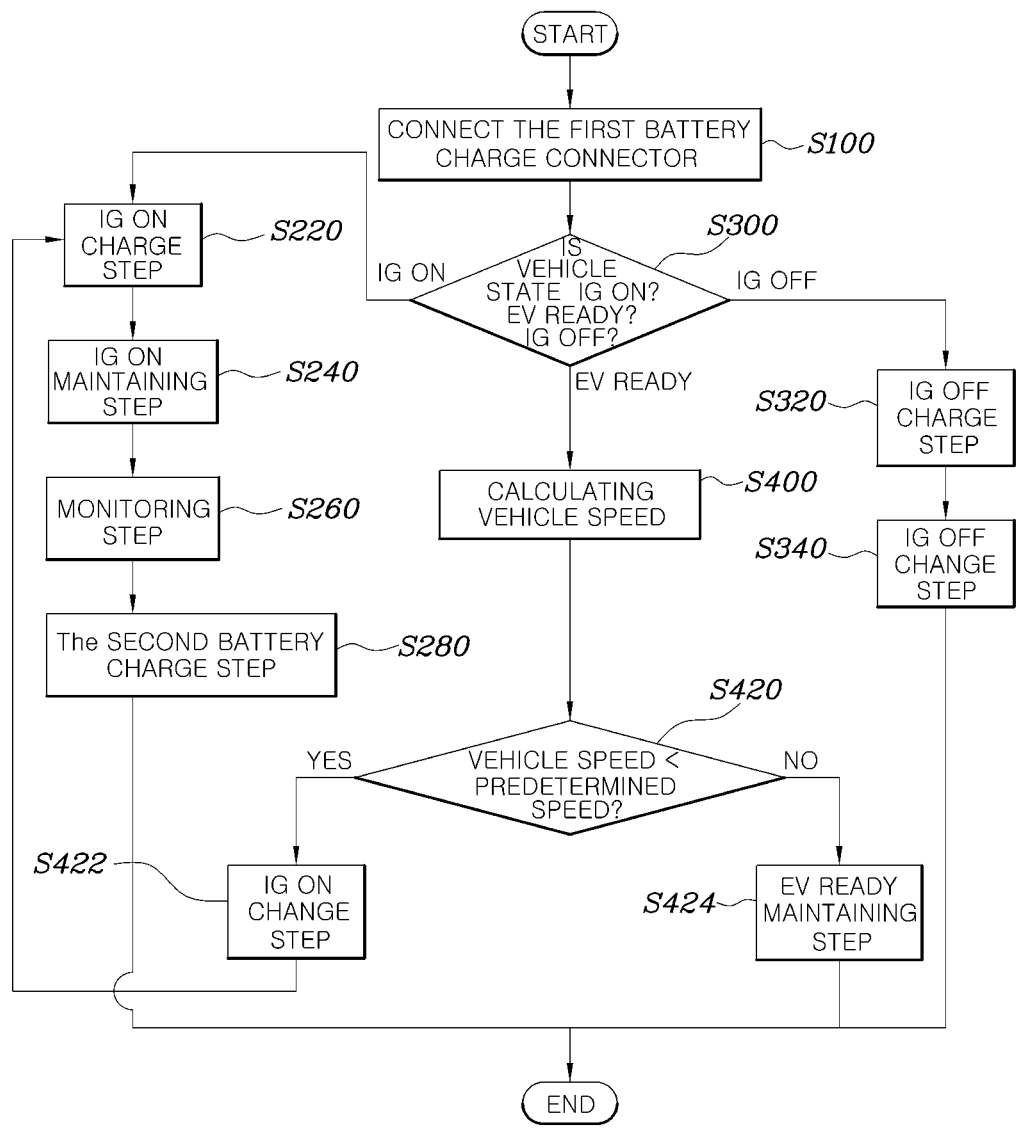
FIG. 1 is an exemplary flow chart of a charge control method for a vehicle according to an exemplary embodiment of the present invention.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
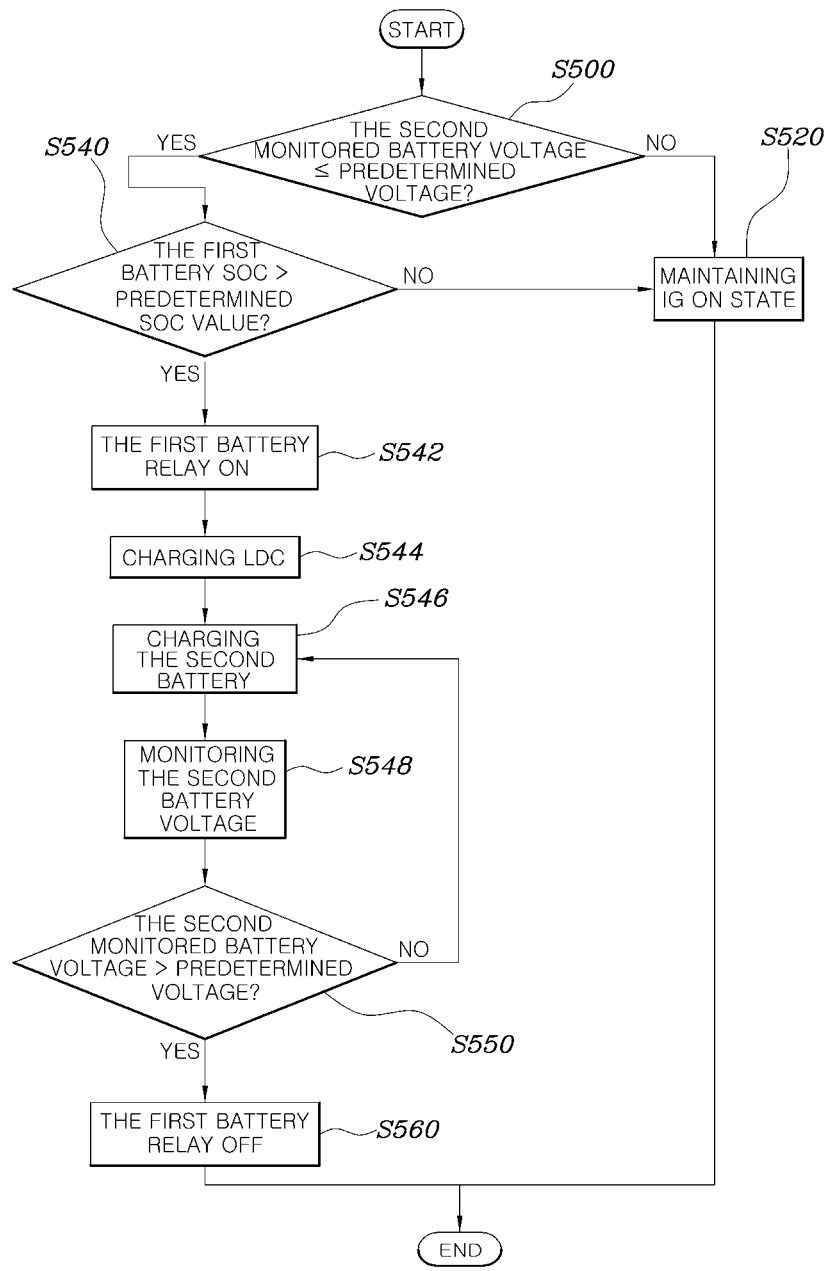
FIG. 2 is an exemplary flow chart of the second battery charge step including SOC verification step according to an exemplary embodiment of the present invention.

FIG. 1 illustrates an exemplary flow chart of a charge control method for a vehicle according to an exemplary embodiment of the present invention. FIG. 2 illustrates an exemplary flow chart of the second battery charge step including a SOC verification step according to an exemplary embodiment of the present invention. The methods as described herein below may be executed by a controller having a processor and a memory. As shown in FIG. 1, the exemplary embodiment may include a verifying whether a first battery charging connector connects to a vehicle S100. After verifying S100, the charge control method for a vehicle may be varied based on whether the vehicle state applies one operational among IG OFF operational state, IG ON operational state or EV READY mode. The charge control method for a vehicle disposed in the IG ON operational state, may include charging a first battery S220; maintaining the IG ON operational state following completion of the charge of the first battery in the IG ON operational state S240. Further, a second battery voltage while maintaining the IG ON operational state may be monitored S260; and the vehicle controller may charge a second battery by engaging the first battery S280.

Specifically, the exemplary embodiments may include monitoring S260 a second battery voltage and the second battery charge S280. The first battery may be stably charged with the vehicle disposed in the IG ON operational state. The vehicle may maintain the IG ON operational state for an extended duration thereby potentially precluding the vehicle start-up limitations. The first battery and the second battery of the exemplary embodiments may exist in various forms based on the type of the vehicle. However, if the exemplary embodiments are applied to general eco-friendly vehicle, the first to battery may be a high voltage battery that supplies power to a motor of a vehicle, and the second battery may be an auxiliary battery that supplies power for vehicle start-up and to main electric components within a vehicle.

Considering the exemplary embodiments, the vehicle operation may be continuously maintained with the IG ON operational state, and the vehicle start-up limitations occur due to electric field load in vehicle. For example, the vehicle may be disposed in the IG ON operational state, even when driving of the vehicle driving is impossible, vehicle controllers may remain in the ON operational state such that continuous power consumption may occur by the vehicle controllers. Therefore, the second battery voltage may supply power to the vehicle controllers and may be reduced due to the electric field load connected to the second battery as the IG ON operational state may be maintained for an extended duration. Upon termination, the second battery voltage may be reduced below the required minimal voltage for vehicle start-up, and the vehicle start-up limitations may occur.

Figure 3:
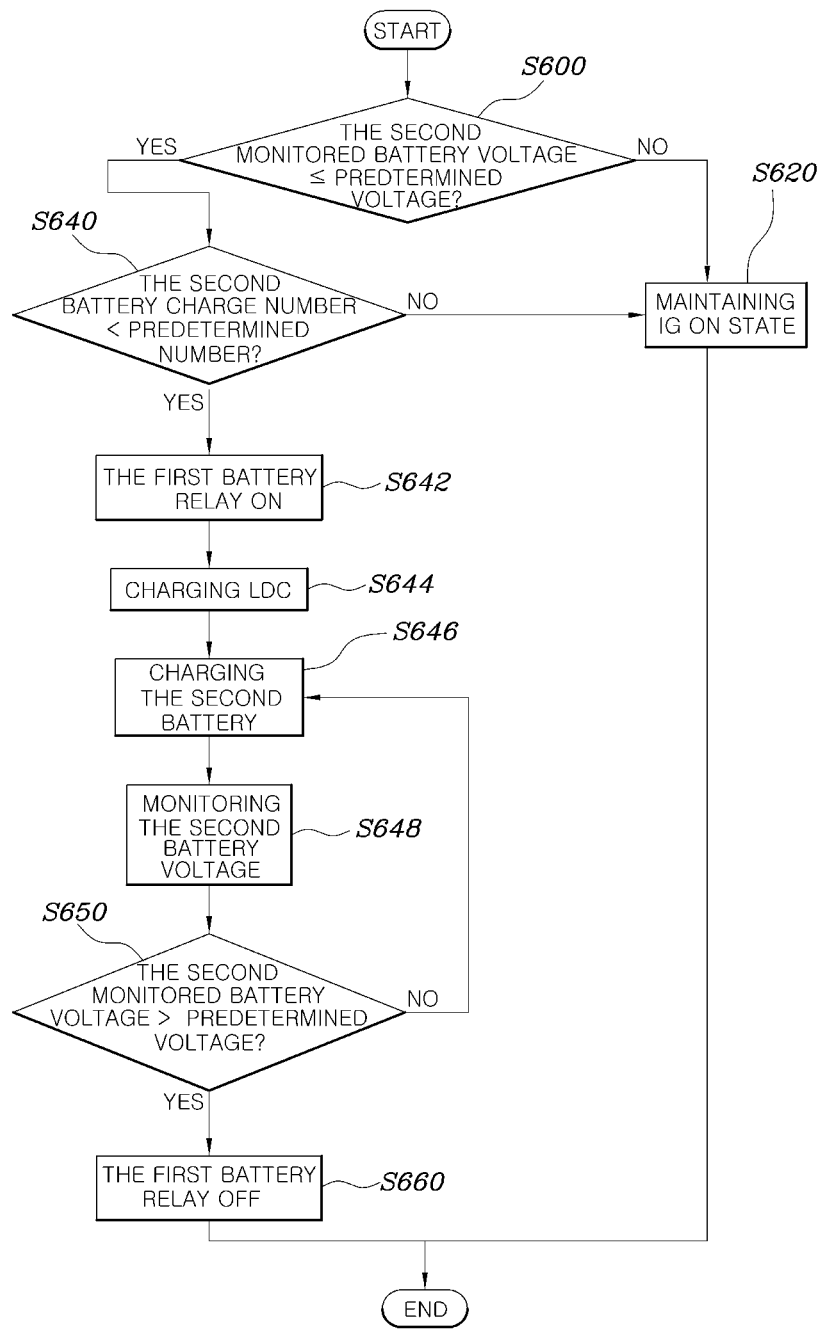
FIG. 3 is an exemplary flow chart of the second battery charge step including charge number verification step according to an exemplary embodiment of the present invention.

Therefore, to resolve the start-up limitations, exemplary embodiments may include monitoring S260 and charging S280. The charging function S280 may fundamentally include a second battery charge initiation step of engaging the second battery charge when the second battery voltage monitored in the monitoring step S260 may be less than a predetermined voltage; and, completing the second battery charge after charging the second battery. As shown, FIGS. 2 and 3 illustrate exemplary flow charts. For example, the predetermined voltage means a required minimum voltage for vehicle start-up and may be also referred to as a threshold voltage. In particular, the second battery charges if the monitored second battery voltage falls below the threshold voltage as minimum voltage for vehicle start-up.

Monitoring S260 the second battery may occur through various methods by the vehicle controllers. The method that directly monitors the second battery voltage by using Battery Management System (BMS) and Vehicle Control Unit (VCU) may be used; the vehicle controller may receive the second battery voltage value monitored within the Low DC/DC Converter (LDC) controller and to monitor the value. Further, the vehicle controller may monitor the second battery value by engaging a separate sensor capable of monitoring the second battery voltage value.

The above exemplary embodiments may apply the method having the vehicle controller receive the second battery voltage value monitored in the LDC controller and thereby monitors the second battery voltage. As shown, FIG. 2 is an exemplary flow chart including verifying the State of Charge (SOC) of the first battery within the second battery charge. Charging the second battery, verifying a SOC value of the first battery S540, engaging a relay ON S542 where the vehicle controller may engage a first battery relay ON, and a initiating a first charge S546 of engaging the second battery charge from the first battery according to the first battery relay ON. Further, included may be monitoring S548 when the vehicle controller monitors the second battery voltage, and adjusting S560 the first battery relay OFF when the second battery voltage exceeds a predetermined voltage.

In other words, charging the second battery shown as shown in FIG. 2, may verify the SOC of the first battery prior to charging the second battery and may begin to charge the second battery when the SOC of the first battery exceeds a predetermined SOC value.

Generally, the SOC of a battery means a battery charge state. The SOC of a battery may be maintained to properly delay a deterioration phenomenon of a battery. Accordingly, the SOC value maintained at a level below or a level that exceeds the target range may contribute to the deterioration phenomenon of a battery which may rapidly occur. Therefore, the exemplary embodiments include verifying the SOC of the first battery prior to charging the second battery in order to prevent deterioration phenomenon of the first battery.

The SOC of the first battery may be verified and, the exemplary embodiments may limit the minimum value of the SOC but does not limit the maximum value of the SOC. For example, the SOC value may not decrease and the case that the SOC value may not increase, since the first battery may be discharged when engaging the first battery relay ON in order to charge the second battery. Additionally, the exemplary embodiments may allow the first battery to charge only when the SOC exceeds the minimum value thereof by setting only the minimum value of the SOC as a predetermined SOC value. Therefore, the present invention may include the step of verifying the minimum value of the SOC.

The reference value of the SOC minimum value for preventing deterioration phenomenon may include various values based on the type and state of a battery. For example, the SOC value of 20% may be regarded as the minimum value, and in some embodiments adjusting the second battery when the SOC of the first battery exceeds more than 20% may be preferable. If the above-mentioned conditions may be satisfied by the SOC of the first battery that may exceed more than 20%, the charge of the second battery may be achieved. For example, the vehicle controller may transfer a signal engaging the first battery relay ON in order to charge the second battery such that the first battery relay becomes engaged in the ON operational state. Accordingly, the first battery may charge the LDC voltage and the LDC may transform a high voltage charged from the first battery to a low voltage to thereby charge the second battery. The low voltage may be transformed by the LDC and may be transferred to the second battery such that the second battery may be charged. The vehicle controller may monitor the second battery voltage in the monitoring step S260 which monitors the second battery voltage while the second battery charges. If the monitored second battery voltage exceeds a predetermined voltage for vehicle start-up, the threshold voltage, the vehicle controller may transfer a signal disengaging the first battery relay to an OFF position such that the first battery relay turns OFF, whereby the charge of the second battery may be terminated.

As shown FIG. 3 illustrates an exemplary flow chart that may include verifying the second battery charge number in the second battery charge which is differentiated from the method as shown in FIG. 2. The charging of the second battery may include verifying the second battery charge number S640. The first battery relay may be engaged in an ON position S642 when the second battery charge number is less than a predetermined number. The second battery charge from the first battery based on the first battery relay ON may be engaged S646. Further, monitoring S648 the second battery voltage and disengaging the first battery relay in an OFF position S660, when the second battery voltage monitored S648 exceeds a predetermined voltage.

The second battery charge step as shown in FIG. 3 may include verifying the second battery charge number unlike the second battery charge step as shown in FIG. 2 that includes verifying the first battery SOC. The second battery charge number in the second battery charge step may be limited to prevent deterioration phenomenon of the first battery, similar to verifying the SOC of the first battery as described above. For example, if the second battery charge number may be increased in a state where the first battery is not charged, the first battery voltage may be continuously reduced. Accordingly, the first battery voltage may be less than a predetermined voltage thereby facilitating the occurrence of the deterioration phenomenon.

Additionally, as the frequency of the battery charge and discharge increases, the battery life may be reduced such that the deterioration phenomenon of a battery may progress rapidly. Charging the second battery as suggested by the exemplary embodiments, may occur when the vehicle controller charges the second battery automatically when the second battery voltage may be reduced below the threshold voltage. Therefore, when the logic limiting the second battery charge number as shown in FIG. 3 is absent, the second battery may continue to charge indefinitely each time the second battery voltage may be reduced below the threshold voltage. Such a frequent charge may adversely affect the functionality of the second battery and thereby shorten the second battery life. Additionally, the deterioration phenomenon of the second battery may be exacerbated. The first batter may also exhibit similar performance concerns. Eventually, the second battery may be the same as discharging in the first battery side. In particular, that the second battery indefinitely charged thereby becomes the same as the first battery indefinitely discharged. Therefore, by limiting the second battery charge number, it may be possible to delay the deterioration phenomenon of the first battery.

The exemplary embodiments may include verifying the second battery charge number due to the above discussed reasons. When the second battery charge number may be less than a predetermined number, the second battery may be allowed to be charged by the first battery. The predetermined number may vary based on the types and states of the first battery and the second battery. However, when the second battery charge number is less than 4 times, the second battery may preferably be allowed to be charged by the first battery. Charging may be implemented when the second battery charge number is less than 4 times and may be implemented with the second battery charge step of FIG. 2 as described above, and the flow chart thereto as also shown in FIG. 3.

Therefore, since the exemplary embodiments may include protection logic capable of charging the second battery voltage in the IG ON maintaining function, it may be possible to charge the first battery even when the vehicle may be in the IG ON operational state. Further, since the second battery may be charged when the vehicle continuously maintains the IG ON operational state after charging, it may be possible to resolve the start-up limitations of the vehicle due to the second battery discharge.

However, following the verifying function S100 the vehicle may not be in the IG ON operational state but may be disposed in the EV READY state.

In other words, when the vehicle in the EV READY state, the vehicle controller may preferentially calculate a vehicle speed S400.

The calculated vehicle speed may be less than a predetermined speed, and the vehicle charge control may be achieved through adjusting the EV READY state of the vehicle to the IG ON operational state S422. Further the functions of charging the IG ON S220, maintaining IG ON S240, monitoring S260 and charging the second battery S280 may also be adjusted. When the calculated vehicle speed exceeds a predetermined speed, the EV READY state of the vehicle may be maintained S424.

The exemplary embodiments may include verifying whether the vehicle speed may be less than or greater than a predetermined speed S420 as described above, because the vehicle is driving unlike the state that the vehicle driving is impossible in the EV READY state. For example, there is minimal benefit to maintaining the charging connector drives connected to the vehicle during operation of the vehicle. For example, when the vehicle speed exceeds a predetermined speed, the vehicle controller may determine during operation of the vehicle and may override (e.g. ignores) a charging connector connection signal to maintain the EV READY state. Generally, it may be preferable to regard the criteria of the predetermined speed as 1 kph.

In certain circumstances the vehicle may be capable of charging if the calculated vehicle speed falls below the predetermined speed, the vehicle charge control may be achieved in the same manner as the vehicle charge control method in the IG ON function as described above after the vehicle controller adjusts the vehicle state to the IG ON operational state. Furthermore, monitoring the second battery voltage after charging and charging the second battery when the second monitored battery voltage falls below a predetermined voltage may be equally applied.

However, some circumstances may require adjusting the vehicle state from the EV READY state to the IG ON operational state.

For example, the vehicle charge may be achieved in the EV READY state without being changed to the IG ON operational state, the vehicle may drive in the EV READY state when a driver engages an acceleration pedal accidentally or arbitrarily during charging such that the vehicle moves during charging the first battery. Such an action may create a dangerous situation for the vehicle and the driver. In order to prevent this situation, the exemplary embodiments adjust the vehicle state to the IG ON operational state that prevents moving of the vehicle. Furthermore, with the vehicle disposed in the EV READY state, the vehicle state may be in a state capable of charging at the end, in other words, when the vehicle speed falls below a predetermined speed, the first battery of the vehicle may be able to be charged safely. Even maintaining the vehicle for an extended duration in the IG ON operational state after charging, the situation that precludes start-up of the vehicle due to the second battery discharge may be prevented.

The charge control method for a vehicle disposed in the vehicle state in the IG OFF state, may include an IG OFF charge S320 when the vehicle controller may adjust the vehicle state to the IG ON operational state and then may charge the first battery. Further an IG OFF change S340 may occur when the vehicle controller adjusts the vehicle state from the IG ON operational state to the IG OFF operational state. In particular, when the vehicle may be disposed in the IG OFF operational state, the vehicle controller may adjust the vehicle state to the IG ON operational state preferentially in order to initiate vehicle charging. However, the vehicle state may be returned to the IG OFF operational state by the vehicle controller after completion of the vehicle charging unlike the vehicle charging in the IG ON operational state.

Therefore, after completion of the vehicle charging in the IG OFF operational state, the IG ON operational state may not be maintained such that the voltage reduction of the second battery does not occur due to the electric field load. Thus, the vehicle charging in the IG OFF operational state does not monitor the second battery voltage unlike the vehicle charging in a state of the IG ON or the EV READY such that the protection logic for the second battery discharge protection may not be applied thereto as shown in FIG. 1.

While this invention has been described in connection with what is presently considered to be exemplary embodiments on the contrary, it is intended to cover various modifications and equivalent arrangements, without departing from the scope and spirit of the invention as disclosed in the accompanying claims. In addition, it is to be considered that all of these modifications and alterations fall within the scope of the present invention

What is claimed is:

1. A charge control method for a vehicle comprising:
   verifying with a vehicle controller whether a first battery charging connector is connected to the vehicle;
   charging a first battery when the vehicle is in IG ON operational state when the first battery charging connector is connected;
   maintaining the IG ON operational state after charging the first battery in the IG ON operational state;
   monitoring with the vehicle controller a second battery voltage while maintaining the IG ON operational state; and
   charging a second battery with the vehicle controller by engaging the first battery based on the result of monitoring the second battery voltage.

2. The charge control method for a vehicle according to claim 1 further comprising:
   adjusting a vehicle state to the IG ON operational state and then charging the first battery when the vehicle is in IG OFF state and when the first battery charging connector is connected; and
   adjusting the vehicle state from the IG ON operational state to the IG OFF operational state after completion of the charge of the first battery.

3. The charge control method for a vehicle according to claim 1 further comprising, calculating a vehicle speed with the vehicle controller when the vehicle is in EV READY state when the first battery charging connector is connected; changing the EV READY state of the vehicle to the IG ON operational state when the calculated vehicle speed is less than a predetermined speed.

4. The charge control method for a vehicle according to claim 3, further comprising, maintaining an EV READY state of the vehicle when the calculated vehicle speed calculated exceeds a predetermined speed.

5. The charge control method for a vehicle according to claim 3, wherein charging the second battery comprises:
   engaging the second battery charge when the second battery voltage monitored is less than a predetermined voltage; and
   terminating the second battery charge after charging the second battery.

6. The charge control method for a vehicle according to claim 1, wherein charging the second battery comprises:
   engaging the second battery charge when the second battery voltage monitored is less than a predetermined voltage; and
   terminating the second battery charge after charging the second battery.

7. The charge control method for a vehicle according to claim 6, wherein charging the second battery comprises:
   verifying a SOC value of the first battery;
   engaging with the vehicle controller a first battery relay ON when the SOC value of the first battery is over a predetermined SOC value; and
   engaging the second battery charge from the first battery according to the first battery relay ON.

8. The charge control method for a vehicle according to claim 6, wherein charging the second battery comprises:
   verifying the second battery charge number;
   controlling the vehicle controller to dispose the first battery relay ON when the second battery charge number is less than a predetermined number; and
   engaging the second battery charge from the first battery based on the first battery relay ON.

9. The charge control method for a vehicle according to claim 6, wherein charging the second battery comprises:
   monitoring the second battery voltage; and
   disposing the first battery relay OFF when the monitored second battery voltage exceeds a predetermined voltage.

10. A charge control system for a vehicle comprising:
    a vehicle controller that verifies whether a first battery charging connector is connected to the vehicle;
    a first battery charged when the vehicle is in IG ON operational state when the first battery charging connector is connected and maintaining the IG ON operational state after charging the first battery;
    a second battery voltage monitored by the vehicle controller while maintaining the IG ON operational state; and
    a second battery that is charged with the first battery based on the result of monitoring the second battery voltage.

11. The charge control system for a vehicle according to claim 10, wherein, a vehicle state is adjusted to the IG ON operational state and the first battery is charged when the vehicle is in IG OFF state and when the first battery charging connector is connected, and the vehicle state is adjusted from the IG ON operational state to the IG OFF operational state after completion of the charge of the first battery.

12. A non-transitory computer readable medium containing program instructions executed by a controller, the computer readable medium comprising:
    program instructions that verify whether a first battery charging connector is connected to the vehicle;
    program instructions that charge a first battery when the vehicle is in IG ON operational state when the first battery charging connector is connected;
    program instructions that maintain the IG ON operational state after charging the first battery in the IG ON operational state;
    program instructions that monitor a second battery voltage while maintaining the IG ON operational state; and
    program instructions that charge a second battery with the vehicle controller by engaging the first battery based on the result of monitoring the second battery voltage .

* * * * *